United States Patent
Shimpi et al.

(10) Patent No.: US 12,058,219 B1
(45) Date of Patent: Aug. 6, 2024

(54) PREDICTIVE COMMUNICATION SYSTEM

(71) Applicant: American Express Travel Related Services Company, Inc., New York, NY (US)

(72) Inventors: Sushil S. Shimpi, Glendale, AZ (US); Tyler C. Colton, Surprise, AZ (US); Meera Girija Varma, Scottsdale, AZ (US); Glenn S. Moriarty, Phoenix, AZ (US); Matthew B. Peters, Peoria, AZ (US); Padma D. Jandhyala, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 213 days.

(21) Appl. No.: 17/144,024

(22) Filed: Jan. 7, 2021

Related U.S. Application Data

(63) Continuation of application No. 15/719,327, filed on Sep. 28, 2017, now abandoned.

(51) Int. Cl.
*H04L 67/50* (2022.01)
*G06N 5/04* (2023.01)
(Continued)

(52) U.S. Cl.
CPC ............. *H04L 67/535* (2022.05); *G06N 5/04* (2013.01); *G08B 21/182* (2013.01);
(Continued)

(58) Field of Classification Search
CPC .. G06Q 30/016; G06Q 30/02; G06Q 30/0232; Y04S 50/14; H04L 67/535;
(Continued)

(56) References Cited

U.S. PATENT DOCUMENTS

| | | | |
|---|---|---|---|
| 9,049,295 | B1 | 6/2015 | Cooper et al. |
| 9,648,164 | B1 | 5/2017 | Harris |

(Continued)

OTHER PUBLICATIONS

Dorotic, Matilda, et al. "Reward redemption effects in a loyalty program when customers choose how much and when to redeem." International Journal of Research in Marketing 31.4 (2014): 339-355 (Year: 2014).

(Continued)

*Primary Examiner* — Brendan S O'Shea
(74) *Attorney, Agent, or Firm* — Thomas Horstemeyer, LLP

(57) ABSTRACT

Disclosed are various embodiments for a predictive communication system. In one embodiment, a communication is received from a user, and a profile associated with the user is identified. Real-time activity data associated with the profile and obtained from one or more internal channels via a messaging bus is accessed. A redeemable value accumulation in the activity data is determined to have reached a specified threshold. An intent prediction alert associated with the communication is determined according to one or more of a plurality of intent prediction rules based at least in part on the redeemable value accumulation reaching the threshold, where the intent prediction alert includes a predicted reason for the communication.

20 Claims, 4 Drawing Sheets

(51) Int. Cl.
*G08B 21/18* (2006.01)
*H04L 51/212* (2022.01)
*H04L 67/306* (2022.01)
*H04L 67/55* (2022.01)

(52) U.S. Cl.
CPC .......... *H04L 51/212* (2022.05); *H04L 67/306* (2013.01); *H04L 67/55* (2022.05)

(58) Field of Classification Search
CPC ..... H04L 67/55; H04L 51/212; H04L 67/306; G06N 5/04; G08B 21/182
See application file for complete search history.

(56) References Cited

U.S. PATENT DOCUMENTS

| | | |
|---|---|---|
| 2006/0018440 A1 | 1/2006 | Watkins et al. |
| 2010/0191658 A1 | 7/2010 | Kannan et al. |
| 2013/0268332 A1* | 10/2013 | Chyu ..................... G06Q 30/06 705/26.1 |
| 2013/0282430 A1* | 10/2013 | Kannan .................. G06Q 30/02 705/7.29 |
| 2014/0044243 A1 | 2/2014 | Monegan et al. |
| 2014/0079195 A1 | 3/2014 | Srivastava et al. |
| 2014/0207622 A1 | 7/2014 | Vijayaraghavan et al. |
| 2014/0249873 A1 | 9/2014 | Stephan et al. |
| 2016/0063065 A1* | 3/2016 | Khatri .................... G06Q 30/02 707/723 |
| 2017/0046700 A1 | 2/2017 | Nandakumar et al. |
| 2023/0036167 A1* | 2/2023 | Yusuf ................. G06Q 30/0203 |

OTHER PUBLICATIONS

Caile, Chris "Predicting the Emmys is hard; predicting customer engagement shouldn't be" Nuance, Sep. 15, 2017, available at: https://whatsnext.nuance.com/customer-experience/predicting-customer-engagement/ (Year: 2017).

* cited by examiner

PREDICTIVE COMMUNICATION SYSTEM

CROSS REFERENCE TO RELATED APPLICATIONS

This application is a continuation of, claims priority to, and the benefit of, U.S. Ser. No. 15/719,327, filed Sep. 28, 2017 and entitled "Predictive Communication System," which is incorporated herein by reference in its entirety.

BACKGROUND

Customers may call a merchant, business, or other product or service provider for a variety of reasons. When placing a telephone call or other communication to the business, the customer may have to convey the reason for the communication, which may be completed through an automated selection menu (or other method), such that the business may identify the context or reason for the customer communication in order to properly route the call. Such methods of identifying the reason for a customer communication may be repetitive in different stages of a communication (e.g., an automated part of a telephone call, and a subsequent transfer to an individual serving as a customer service representative) and time-consuming for a customer.

SUMMARY

A system, method, and article of manufacture (collectively, "the system") are disclosed relating to predicting a reason for a customer communication. In various embodiments, the system may be configured to perform operations including receiving, by a processor, a communication from a customer; identifying, by the processor, a customer profile associated with the customer; accessing, by the processor, account activity data associated with the customer profile; analyzing, by the processor, the account activity data; and/or determining, by the processor, an intent prediction associated with the communication based on analyzing the account activity data. The intent prediction may comprise a predicted reason for the communication.

In various embodiments, the operations may further comprise presenting, by the processor, the intent prediction to the customer; and/or receiving, by the processor, an accuracy response from the customer in response to the presenting the intent prediction. In various embodiments, the operations may further comprise routing, by the processor, the communication to a service system based on the intent prediction. In various embodiments, the operations may further comprise detecting, by the processor, completion of an action; determining, by the processor, a recommended action based on analyzing the account activity data; and/or presenting, by the processor, the recommended action to the customer after detecting the completion of the action.

In various embodiments, determining the intent prediction of the customer may comprise ranking, by the processor, a plurality of intent insights comprised in the account activity data, producing a ranking of the plurality of intent insights; and/or determining, by the processor, the intent prediction by identifying, by the processor, a highest ranking intent insight of the plurality of intent insights. In various embodiments, determining the intent prediction further may comprise determining, by the processor, a priority insight of the plurality of intent insights; and/or adjusting, by the processor, the ranking of the plurality of intent insights based on a priority insight such that the priority insight is the highest ranking intent insight of the plurality of intent insights. In various embodiments, ranking the plurality of intent insights may comprise ranking the plurality of intent insights in chronological order, wherein a most recent intent insight comprises a highest rank. In various embodiments, the operations may further comprise transmitting, by the processor, a context message to an operator of the service system receiving the communication in the response to the routing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
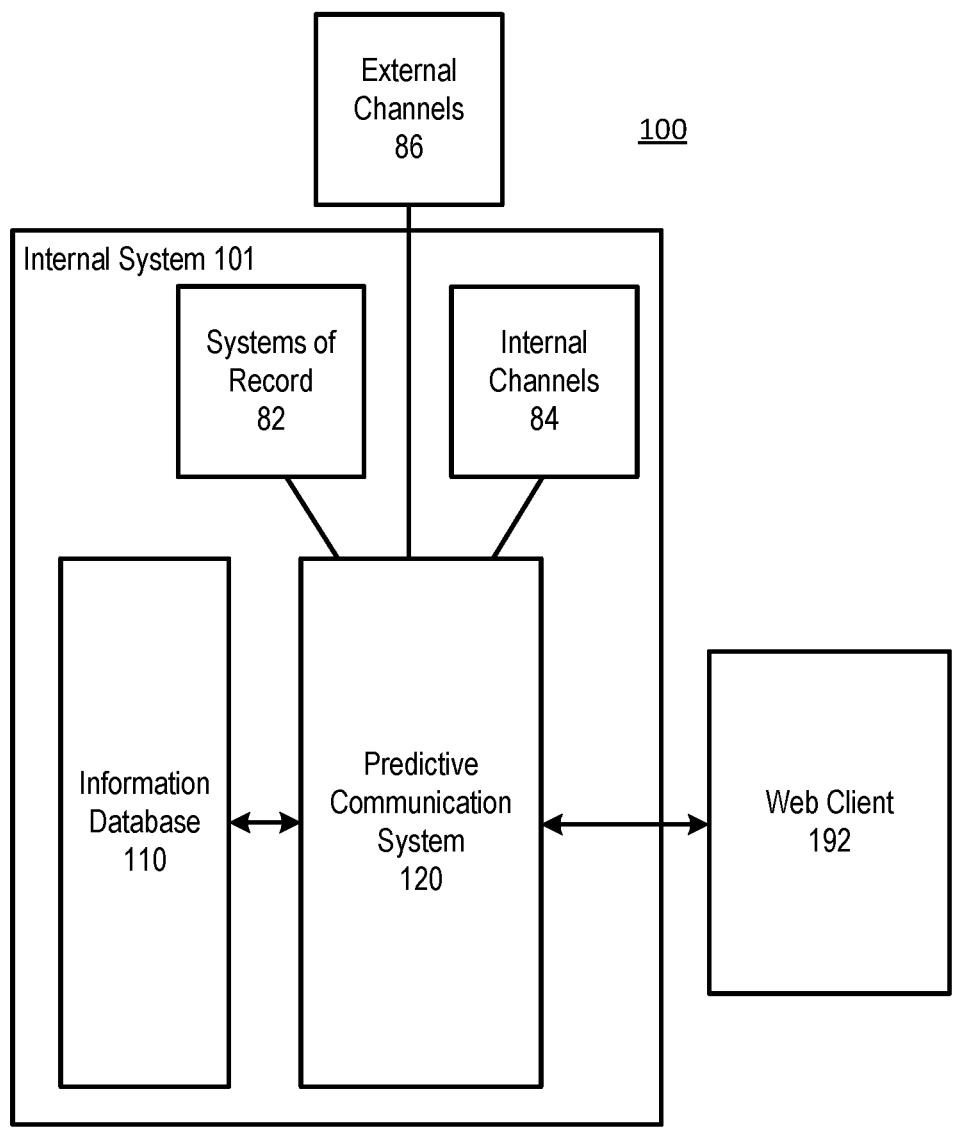
FIG. 1A shows an exemplary communication system comprising a predictive communication system, in accordance with various embodiments.

With reference to FIG. 1A, in accordance with various embodiments, an exemplary communication system 100 is depicted. System 100 may comprise external channels 86, an internal system 101, and/or a web client 192. Internal system 101 and its components may be associated with an entity such as a transaction account issuer. In operation, internal system 101 may receive a communication from a customer (e.g., a telephone call, electronic message, or the like). To expedite the process of communicating with the customer, predictive communication system 120 comprised in internal system 101 may have the capability of accessing and analyzing account activity data (reflecting activity a customer has conducted through his or her customer profile and/or transaction account, which may reflect activity trends) in order to predict the intent of the customer in initiating the customer communication (i.e., the reason for the customer's telephone call or other communication). The system may also analyze the voice tone, or from a video call, the system may analyze customer impressions, body movements and/or facial features to determine customer intent.

In various embodiments, system 100 may comprise various information sources such as systems of record 82 and internal channels 84, which are comprised in internal system 101, and/or external channels 86. In various embodiments, internal system 101 may comprise an information database 110, a predictive communication system 120, systems of record 82, and/or internal channels 84. System 100, internal system 101, and/or predictive communication system 120 may be computer-based, and may comprise a processor, a tangible non-transitory computer-readable memory, and/or a network interface. Instructions stored on the tangible non-transitory memory may allow system 100, internal system 101, and/or predictive communication system 120 to perform various functions, as described herein.

In various embodiments, information database 110 may comprise hardware and/or software capable of storing data. For example, information database 110 may comprise a server appliance running a suitable server operating system (e.g., MICROSOFT INTERNET INFORMATION SERVICES or, "IIS") and having database software (e.g., ORACLE) installed thereon. In various embodiments, information database 110 may store account activity data and customer profile information associated with a customer profile, which is associated with a customer. In various embodiments, information database 110 may store numerous customer profiles associated with numerous customers. The customer profile may be associated with and/or comprise multiple transaction accounts (i.e., the customer utilizes numerous transaction instruments, each of which may be associated with a transaction account). Customer profile information may comprise information about the customer and/or her transaction history such as, merchants transacted with, types of transactions, type of transaction account, frequency of transactions, number of transactions, timing of transactions demographic information, personal information (e.g., gender, race, religion), social media posts, social media comments about the customer, pictures of the customer, video of the customer, or any other information.

The account activity data may comprise information relating to actions the customer has taken through or relating to the customer profile and/or the transaction accounts. For example, account activity data may reflect purchases that the customer has previously made through a transaction account, communications to or from internal system 101 and the entity associated therewith (e.g., communications regarding to maintenance/renewal of a transaction instrument/account, fraud alert, account changes, payments, payment due dates, and/or the like), which may include telephone calls or electronic messages, reward point issuance and redemption, transaction instrument issuance, customer information updates, or any other activity conducted through or relating to the customer profile and/or transaction account. In various embodiments, account activity data may be comprised in the customer profile information.

In various embodiments, information sources, including systems of record 82, internal channels 84, and/or external channels 86 (collectively, the "Information Channels"), may provide predictive communication system 120 and/or information database 110 with account activity data associated with one or more customer profiles. In various embodiments, each Information Channel may comprise a server appliance running a suitable server operating system (e.g., MICROSOFT INTERNET INFORMATION SERVICES or, "IIS") and having database software (e.g., ORACLE) installed thereon. Each Information Channel may each comprise multiple information sources.

In various embodiments, systems of record 82 may comprise account activity data relating to a transaction instrument or a transaction account in a customer profile. For example, the account activity data in systems of record 82 may be related to rewards programs (e.g., loyalty rewards issued to the customer profile and the customer's redemption of the rewards), transactions conducted using the customer profile and/or an associated transaction account, authorization information such as approvals for transactions conducted through transaction account, the issuance of new or replacement transaction accounts to a customer profile, and/or the like.

In various embodiments, internal channels 84 may comprise various communication channels available to the customer to communicate with internal system 101 and the associated entity (e.g., a transaction account issuer). For example, internal channels 84 may comprise account activity data related to customer communications between internal system 101 and the customer through a customer profile, a mobile device and/or application, electronic messaging (e.g., email, instant messaging, social media channels, video calls or the like), telephone calls, and/or the like. Internal channels 84 may comprise account activity data related to the content, timing, and/or results of the customer communications, actions preceding or resulting from the customer communications, or any other information related to customer communications within internal system 101. For example, communications between the customer and internal system 101 may be exchanged through internal channels 84 regarding the customer's need of a new transaction instrument, payment of a balance, or any other suitable topic.

In various embodiments, external channels 86 may comprise various communication channels that are not a part of internal system 101. Internal system 101 may integrate with external channels 86 (e.g., by an application programming interface (API)) such that information may be transmitted between internal system 101 and external channels 86. External channels 86 may comprise social media networks such as Facebook®, Twitter®, Instagram®, or any other external communication system which the customer may use to communicate (e.g., an external email system). Account activity data from external channels 86 may comprise messages posted and/or sent by the customer on a social media account (which may be comprised in the customer profile) relating to a customer's transaction instrument and/or transaction account. For example, a customer may post on a social media website how the customer misplaced a transaction instrument. Because of the integration between internal system 101 and external channels 86, internal system 101 may be able to detect such a post as relevant (e.g., by recognizing key words relating to transaction instruments or accounts) and utilize the post as account activity data because it relates to the customer's transaction instrument and/or transaction account.

In various embodiments, predictive communication system 120 may comprise hardware and/or software capable of analyzing and/or storing data. For example, predictive communication system 120 may comprise a server appliance running a suitable server operating system (e.g., MICROSOFT INTERNET INFORMATION SERVICES or, "IIS") and having database software (e.g., ORACLE) installed thereon. Predictive communication system 120 may be in electronic communication with information database 110, the Information Channels (systems of record 82, internal channels 84, and/or external channels 86), and/or web client 192. Predictive communication system 120 may function to predict the reason for a customer's communication placed to internal system 101 (i.e., determine an intent prediction). In response to internal system 101 receiving a customer communication (e.g., a telephone call, video call, etc) from a customer, predictive communication system 120 may identify a customer profile associated with the customer, receive the account activity data from the Information Channels and/or information database 110 associated with the customer profile, receive customer profile information from information database 110, and analyze the account activity data and/or customer profile information to determine the intent prediction.

Figure 1B:
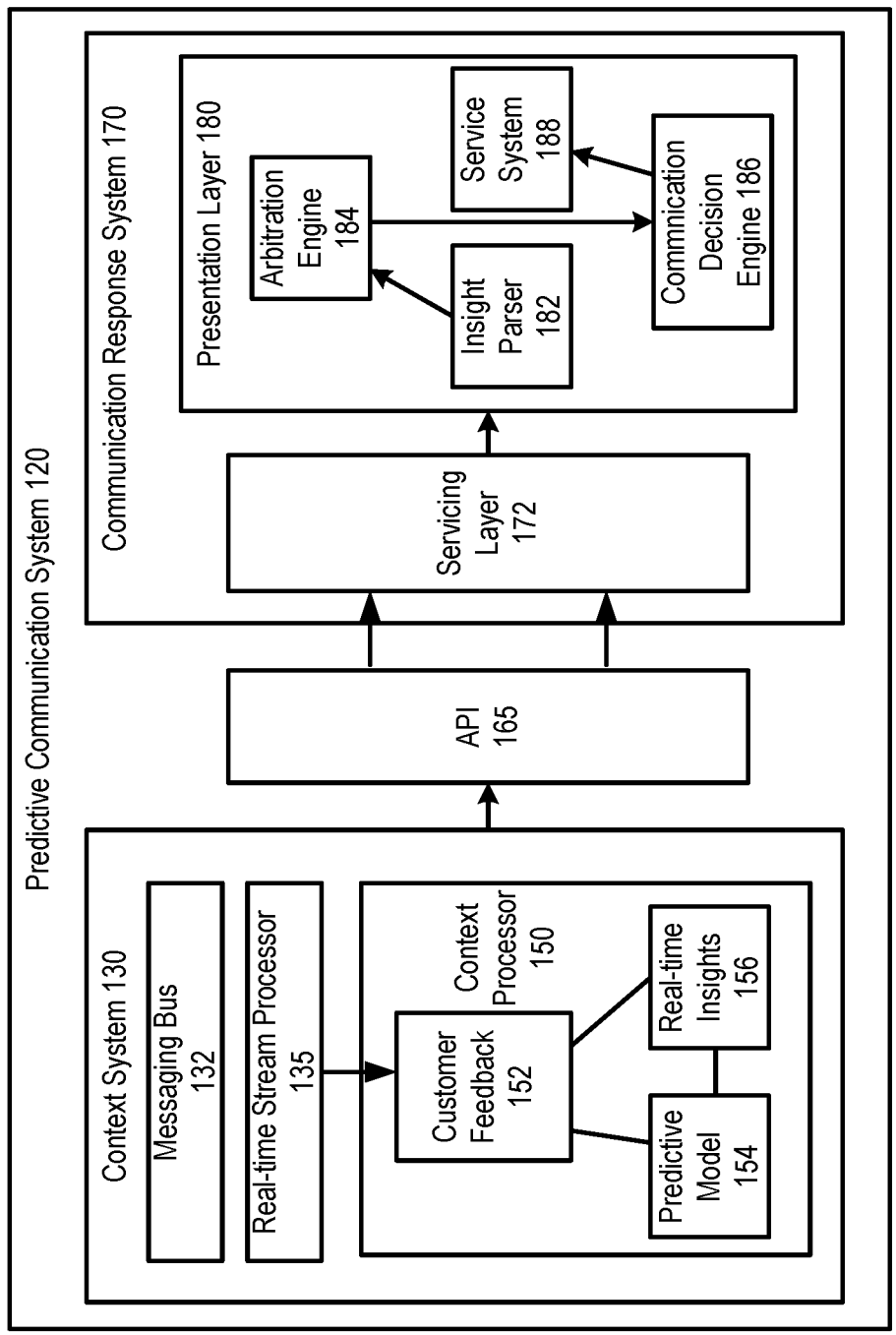
FIG. 1B shows an exemplary predictive communication system, in accordance with various embodiments.

In various embodiments, with reference to FIGS. 1A and 1B, predictive communication system 120 may comprise a context system 130 and/or a communication response system 170. In various embodiments, predictive communication system 120 and/or context system 130 may comprise a messaging bus 132. Messaging bus 132 may comprise a logical interconnection permitting communication amongst the engines, databases, and other components of internal system 101 and/or system 100 as a whole. For example, messaging bus 132 may comprise a bus network arrangement wherein each engine, database, and component may be in communication with a main cable or link, enabling logical communication amongst each engine, database, and/or component. In other words, all channels from which information or communications may be received (e.g., the Information Channels, information database 110, communication response system 170 and context system 130 within predictive communication system 120, etc.) may be integrated and/or in electronic communication with one another so each component of internal system 101 and/or system 100 may share the same information. Thus, any information received and/or transmitted from one component of system 100 may be shared with and/or received by other components of system 100.

In various embodiments, context system 130 may comprise hardware and/or software capable of analyzing and/or storing data. For example, context system 130 may comprise a server appliance running a suitable server operating system (e.g., MICROSOFT INTERNET INFORMATION SERVICES or, "IIS") and having database software (e.g., ORACLE) installed thereon. In various embodiments, context system 130 may comprise a context processor 150. Context processor 150 may be in electronic communication with information database 110 and the Information Channels, and may receive account activity data associated with a customer in response to internal system 101 receiving a communication (e.g., a telephone call) from the customer. Context processor 150 may also be in electronic communication with real-time stream processor 135, which may retrieve real time account activity data from the Information Channels in response to receiving a communication from a customer.

In various embodiments, context processor 150 may comprise customer feedback 152, a predictive model 154, and/or real-time insights 156. In various embodiments, the account activity data may comprise intent insights, which may be pieces of data that reflect past or recent actions (including communications, posts, etc.) by and/or to the customer, or related to the customer, whether thru the customer profile in internal system 101 or through external channels 86. Real-time insights 156 may be the real-time account activity, comprising real-time intent insights (e.g., a type of intent insight), that is retrieved from Information Channels by real-time stream processor 135 and transmitted to context processor 150. Context processor 150, via predictive model 154 comprising analysis rules, may analyze the account activity, including real-time insights 156, to determine ranking of the intent insights comprised in the account activity data. The analysis rules of predictive model 154 may be based on prior customer servicing interactions (e.g., the number, frequency, topics, of such interactions), communication channels, and other information used to train predictive model 154 to determine priority ranking of intent insights.

In various embodiments, predictive model 154 may analyze various aspects of account activity data, and rank the intent insights comprised therein based on those aspects. For example, predictive model 154 may rank intent insights by their time stamp (e.g., the most recent action taken by the customer received by context system 130 may receive the highest ranking). As a further example, going along with the time stamp example, predictive model 154 may rank intent insights reflecting recent customer interactions as relatively high, such as a customer recently communicating with internal system 101 via an internal channel 84, for example, about a card replacement, potential fraud, a transaction question, etc. Predictive model 154, therefore, may recognize that a customer communication initiated by a customer may likely be about the recent customer interaction. As yet another example, predictive model 154 may detect account activity data comprising accumulation of various values in a customer profile, such as a late fee(s), reward points, etc. In response to such values reaching a certain threshold, predictive model 154 may provide intent insights reflecting the value accumulation with a relatively higher rank, because at such a threshold of accumulated value (the threshold may be predetermined), an action taken by or toward the customer may be imminent (e.g., an action to get late fees paid may be taken by a collection agency, or the customer may be able to redeem a certain item with the accumulated reward points). In various embodiments, predictive model 154 may rank intent insights by another characteristics of the intent insights, such as importance or urgency (e.g., an intent insight related to fraud may be ranked as more urgent than other intent insights).

In various embodiments, customers may provide feedback on the ranking of intent insights. For example, a customer may place a communication (e.g., a telephone call) to internal system 101, and predictive communication system 120 may present the customer with an intent prediction, or a list of ranked actions, about which the customer may be calling based on analysis of account activity data by predictive communication system 120. If the intent prediction presented to the customer is correct (i.e., the intent prediction reflects the reason for the customer's communication), the customer may indicate "yes" in an accuracy response. If the intent prediction is incorrect, the customer may indicate "no" in an accuracy response. The accuracy responses may be comprised in customer feedback 152, and provided to predictive model 154 to incorporate into its analysis rules for future analysis of account activity data, which may increase the accuracy of future intent predictions.

In various embodiments, context system 130 may output an API 165 comprising the ranked list of intent insights for the customer, transmitting API 165 to communication response system 170. In various embodiments, communication response system 170 may comprise hardware and/or software capable of analyzing and/or storing data. For example, communication response system 170 may comprise a server appliance running a suitable server operating system (e.g., MICROSOFT INTERNET INFORMATION SERVICES or, "IIS") and having database software (e.g., ORACLE) installed thereon. Communication response system 170 may be in electronic communication with context system 130 such that information (e.g., API 165) may be transmitted therebetween. In various embodiments, communication response system 170 may comprise a servicing layer 172, and a presentation layer 180 in electronic communication with servicing layer 172.

Servicing layer 172 may function to receive API 165 from context system 130 and transmit API 165 to presentation layer 180. Servicing layer 172 may also be in electronic communication with one or more of the Information Channels, such as systems of record 82, to receive and collate intent insights. In various embodiments, presentation layer 180 may comprise an insight parser 182, an arbitration engine 184, a communication decision engine 186, and/or a service system 188. Insight parser 182 may be configured to receive the ranked list of intent insights from servicing layer 172 that was comprised in API 165, read the rank of each intent insight of the ranked list (the rank may be a rank marker placed on each intent insight by predictive model 154), map the intent insights according to each rank, and transmit the mapped, ranked intent insights to arbitration engine 184. For example, mapping the intent insights by insight parser 182 may comprise insight parser 182 notating which intent insight is ranked as the highest priority, and then mapping or ordering the intent insights from there. In various embodiments, arbitration engine 184 may be configured to read the ranking and mapping of the intent insights, and further arbitrate the ranked list of intent insights, such as further determining the highest priority intent insight (i.e., which intent insight most likely reflects the reason the customer may be calling internal system 101).

In various embodiments, arbitration engine 184 may implement business rules to determine which intent insights may be the highest ranking. For example, arbitration engine 184 may determine that the closest intent insight in time to the communication by the customer may be the highest ranking intent insight. As an example, a customer may access the associated customer profile online and an attempt to order a replacement transaction instrument, which may not be completed. In response, the customer may then call internal system 101 soon after attempting the online replacement to complete the replacement order. Arbitration engine 184 may recognize the temporal proximity of the intent insight reflecting the online attempted replacement (which may have been received by predictive communication system 120 from systems of record 82 and/or internal channels 84), and the customer call. Therefore, arbitration engine 184 may determine that the highest ranking intent insight is the most recent intent insight regarding the attempted online transaction instrument replacement. Arbitration engine 184 may also determine that an intent insight of the plurality of intent insights received by communication response system 170 may be a priority insight. As examples of priority insights, the business rules in arbitration engine 184 for prioritizing intent insights may cause intent insights related to fraud to rank highest, or certain correlations may cause an intent insight to be ranked higher than another that is temporally closer to the customer's communication. As an example, arbitration engine 184 may recognize that an intent insight reflecting an account payment is always conducted on a certain day of the month by the customer calling into internal system 101. Therefore, if the customer calls internal system 101 on that day of the month, the intent insight reflecting account payment may be ranked higher than other intent insights having different characteristics. By analyzing the ranking of the intent contexts, arbitration engine 184 may determine an intent prediction (i.e., the most likely reason for a customer's communication (e.g., telephone call)). Arbitration engine 184 may transmit the intent prediction to communication decision engine 186.

Communication decision engine 186, in various embodiments, may receive the intent prediction from arbitration engine 184. Communication decision engine 186 may be configured to route the customer communication (e.g., telephone call) to the appropriate service system 188. A service system 188 may be the communication that the customer receives, in response to initiating a customer communication. Accordingly, communication decision engine 186 may analyze the intent prediction and match the intent prediction with an appropriate service system 188 to respond to the customer communication. For example, if the intent prediction reflects a prediction that the customer wishes to request a replacement transaction instrument, communication decision engine 186 may route the customer communication to an automated (voice) response system that is specifically for card replacement. The intent prediction and routing to an appropriate service system 188 may occur before the customer has to take any action after initiating a communication with internal system 101 (except, in some cases, providing a customer identifier to confirm the customer's identity). As another example, communication decision engine 186 may recognize that an intent prediction is related to a predicted action by the customer that cannot be completed by certain service systems 188 (e.g., automated service systems 188), such as to address fraud on a transaction account. Accordingly, communication decision engine 186 may route the customer communication to a service system 188 allowing person-to-person communication. In various embodiments, there may be a service system 188 for each action to be completed by the customer, or multiple actions may be associated with a service system 188.

In various embodiments, web client 192 may incorporate hardware and/or software components. For example, web client 192 may comprise a server appliance running a suitable server operating system (e.g., MICROSOFT INTERNET INFORMATION SERVICES or, "IIS"). Web client 192 may be any device that allows a user to communicate with a network (e.g., a personal computer, personal digital assistant (e.g., IPHONE®, BLACKBERRY®), tablet, cellular phone, kiosk, telephone, and/or the like). Web client 192 may be in electronic communication with internal system 101, predictive communication system 120, and/or communication response system 170 (e.g., in response to a customer initiating a communication via web client 192).

Web client 192 includes any device (e.g., personal computer, mobile device, telephone, etc.) which communicates via any network, for example such as those discussed herein. In various embodiments, web client 192 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with a server via a network by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, browser may be configured to display an electronic channel.

Figure 2:
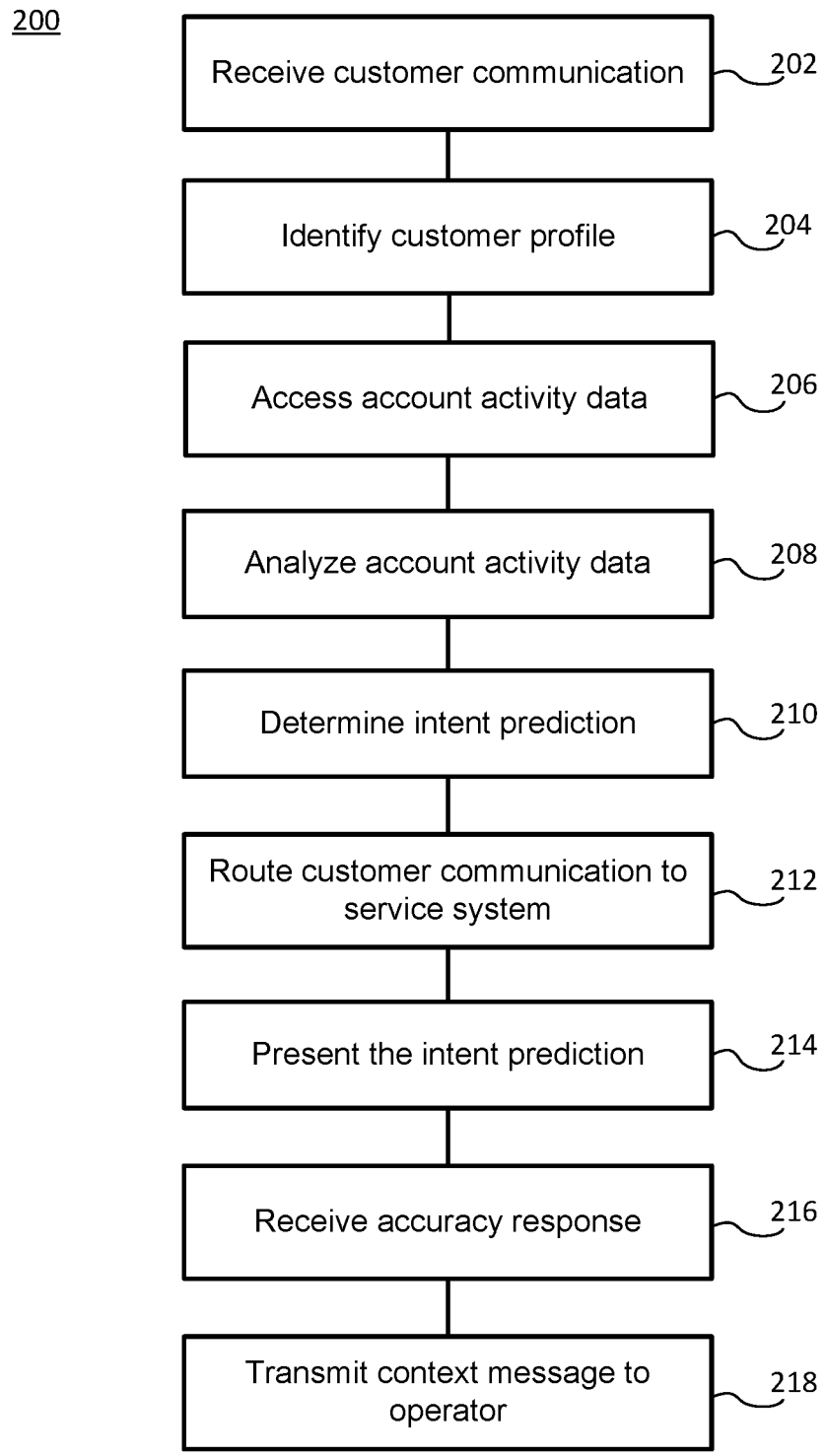
FIG. 2 shows a flowchart depicting an exemplary method for predicting a customer communication intent, in accordance with various embodiments.
Figure 3:
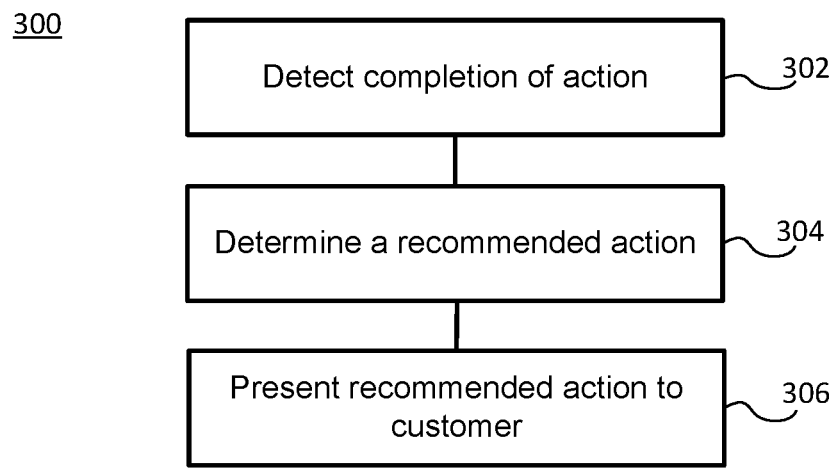
FIG. 3 shows a flowchart depicting an exemplary method for determining a recommended action for a customer, in accordance with various embodiments.

Referring now to FIGS. 2 and 3 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2 and 3, but also to the various system components as described above with reference to FIGS. 1A and 1B.

With combined reference to FIGS. 1A, 1B, and 2, in accordance various embodiments, a method 200 for predicting a customer communication intent is depicted. In various embodiments, a customer having a customer profile associated and/or comprised in internal system 101 may initiate a communication with internal system 101. Such customer communications will be referred to as telephone calls herein, however, the customer communication may be any communication (e.g., in real time), such as instant messaging, or other types of electronic messaging, video chat, and/or the like. In various embodiments, internal system 101 may have transmitted a notification to the customer profile instructing the customer to contact internal system 101. In response to the customer initiating a customer communication with internal system 101, internal system 101 and/or predictive communication system 120 may receive the customer communication (step 202).

Internal system 101, in response to receiving the customer communication, may identify the customer profile (step 204) associated with the customer initiating the customer communication. In various embodiments, internal system 101 may identify the customer profile by receiving a customer profile identifier (e.g., a password, social security number, biometric (e.g., fingerprint, voice print or facial recognition from a video call), or the like) and matching the customer profile identifier with a saved identifier. In various embodiments, the customer profile identifier may be a telephone number, in which case, internal system 101 may automatically match the telephone number from which the telephone call is received with a stored telephone number associated with the customer profile, thereby identifying the customer profile and authenticating the identity of the customer. In various embodiments, the customer profile identifier may be requested of customer by internal system 101, and input by the customer. The system may require the customer to answer additional security questions or enter additional identifying data.

In response to identifying the customer profile, internal system and/or predictive communication system 120 may access the account activity data (step 206) associated with the customer profile (and/or a spouse account activity, supplemental account activity, etc). As described herein, predictive communication system 120 and/or context system 130 may retrieve and/or receive the account activity data associated with the customer profile from information database 110 and/or the Information Channels. In various embodiments, real-time stream processor 135 may retrieve real-time account activity data from the Information Channels. In various embodiments, account activity data that occurred within a determined duration may be retrieved, such as a week or a month (account activity data happening too far in the past may be irrelevant to the reason for the customer communication).

Context processor 150, utilizing real-time insights 156, customer feedback 152, and the analysis rules of predictive model 154, may analyze the account activity data (step 208). As discussed herein, predictive model 154 may analyze the account activity data by ranking the intent insights comprised in the account activity data by priority (or the likelihood that an action reflected by a certain intent insight is the reason for the customer communication). Again, intent insights may be pieces of data that reflect past and/or recent actions (including communications) by the customer or related to the customer whether thru the customer profile in internal system 101 or through external channels 86. For example, predictive model 154 may rank the intent insights chronologically, with the most recent intent insight (reflecting the most recent action taken by the customer) ranked first. For example, if the customer tried most recently to replace a card, or internal system 101 instructed the customer to initiate a customer communication with internal system 101, an intent insight reflecting such action would be ranked highest. In various embodiments, the analysis rules of predictive model 154 may cause ranking of intent insights in any suitable manner (e.g., by type, wherein certain types of intent insights are ranked higher, such as fraud-related insights, or by chronology and type, and/or the like). Accordingly, predictive model 154 may create a ranked list of intent insights.

Context system 130 may transmit an API 165 comprising the ranked intent insights to communication response system 170 to further analyze the account activity data (continuing with step 208). As discussed herein, servicing layer 172 may receive the API 165 and transmit it to presentation layer 180. Insight parser 182 may receive the ranked intent insights from servicing layer 172. Insight parser 182 may read the rank of each intent insight, and map the intent insights according to each rank (e.g., producing a ranked list to be further analyzed by arbitration engine 184). Insight parser 182 may transmit the mapped, ranked intent insights to arbitration engine 184. Arbitration engine 184 receive the mapped, ranked intent insights from insight parser 182, and may read the ranking and mapping of the intent insights, and determine the highest priority intent insight (i.e., which intent insight most likely reflects the reason the customer may be calling internal system 101 regarding).

As discussed herein, arbitration engine 184 may implement business rules to determine which intent insights may be the highest ranking or priority. For example, arbitration engine 184 may determine that the closest intent insight in time to the telephone call by the customer to internal system 101 may be the highest ranking intent insight. As an example, if the chronologically closest intent insight reflected a communication from internal system 101 to the customer profile instructing the customer to call internal system 101 about a topic (an intent insight), the customer communication would likely be regarding that topic. Therefore, that intent insight, being closest in temporal proximity to the customer's telephone call to internal system 101, may be determined as the highest ranking intent insight. Or, there may be types of intent insights which may be priority insights. Going with the same example above, if the customer has a transaction dispute, but internal system 101 instructed the customer to call internal system 101 before the transaction dispute, an intent insight relating to an instruction to call may be prioritized higher than the intent insight reflecting the transaction dispute. That is, arbitration engine 184 may determine the presence of a priority insight of the intent insights analyzed, and adjust the ranking of the intent insights (which was originally chronological) based on the priority insight. As a further example, intent insights reflecting matters of fraud or transaction account decline may be prioritized higher (i.e., may be priority insights) than other types of intent insights or chronological rankings. Arbitration engine 184 may determine an intent prediction (step 210) associated with the customer communication based on arbitration engine's 184 analysis of the account activity data (and analysis performed by other components of predictive communication system 120).

In response to determining the intent prediction, communication decision engine 186 may receive the intent prediction from arbitration engine 184, and may determine the appropriate service system 188 to route the customer communication. In response to determining the appropriate service system 188, communication decision engine 186 may route the customer communication to the service system 188 (step 212). Each service system 188 may be a communication system to address certain actions (e.g., transaction instrument replacement, account freezing, fraud, balance payment, etc.). For example, if the action is something that can be taken care of over an automated service system 188, communication decision engine 186 may route the customer communication to an automated service system 188. In response, presentation layer 180 may present the intent prediction (step 214) to the customer (e.g., via a push notification). Such a presentation may comprise an accuracy inquiry, inquiring if the action reflected in the intent prediction is the reason for the customer's call. In response, the customer may indicate "yes" or "no" (in various embodiments, by pressing a button, speaking, or otherwise providing an electronic input to predictive communication system 120), which may be an accuracy response (customer feedback 152). Internal system 101 and/or predictive communication system 120 may receive the accuracy response (step 216), and transmit the results as customer feedback 152 for predictive model 154 to utilize. In response to receiving a positive accuracy response, presentation layer 180 may continue with the same service system 188. In response to receiving a negative accuracy response, presentation layer 180 may re-route the customer communication to another service system 188 (e.g., a selection menu to allow the customer to input the reason for the call).

In various embodiments, the steps of method 200 may be executed in any suitable order. For example, the intent prediction may be presented to the customer (step 214) in response to determining the intent prediction (step 210), the customer may input, and predictive communication system 120 may receive, an accuracy response (step 216) based on the intent prediction presentation, and subsequently, the customer communication may be routed to the appropriate service system (step 212). In various embodiments, an intent prediction may be comprised as part of a service system 188.

As discussed above, if the action or reason for the customer communication cannot be resolved through an automated service system 188, communication decision engine 186 may route the customer communication to a service system 188 allowing person-to-person communication. In such embodiments, predictive communication system 120 may transmit a context message to the operator (e.g., a customer service representative) (step 218) of the service system 188 associated with internal system 101 conveying the intent prediction determined by predictive communication system 120 (through context processor 150 and presentation layer 180). That way, the operator will have the information reflecting the predicted reason for the customer's call (provided by the context message), and the customer does not have to convey the reason to the operator, which may be repetitive (e.g., if a process was started online via computer, and then required a telephone call, on the telephone call, the customer would not have to repeat the information already provided online).

Referring to FIG. 3, a method 300 for determining a recommended action for a customer is depicted. In various embodiments, with combined reference to FIGS. 1A, 1B, and 3, predictive communication system 120 may detect completion of an action (step 302). The customer may have completed the action for which she was calling (e.g., requesting a replacement transaction instrument, disputing a transaction, or resolving another issue), or the completed action may comprise a negative accuracy response. The completed action may be a stopping point for the customer communication.

Predictive communication system 120 may determine a recommended action (step 304), or multiple recommended actions. Arbitration engine 184 may analyze the ranked intent insights received from context system 130, and determine a recommended action based on the business or analysis rules, similar to the analysis comprised in step 208 of method 200 (FIG. 2). The recommended action may be another action which the customer may wish to take during the customer communication. In various embodiments, the recommended action may be the second highest priority of the ranked invent insights. For example, a priority insight may have ranked highest (e.g., relating to fraud), but the closest intent insight temporally may have been a notice that an account balance payment is due (which was ranked second). Therefore, arbitration engine 184 may determine the recommended action may be paying the account balance. In various embodiments, the recommended action may be actions available to the customer, unrelated to the intent insight ranking. For example, predictive communication system 120 may recognize that a balance payment due data for a transaction account is on a day which the customer has travel plans (e.g., through internal system's 101 integration with an external channel 86 such as an airline). Therefore, arbitration engine 184 may determine that the recommended action may be payment of the balance.

In response to determining a recommended action, presentation layer 180 may present the recommended action to the customer (step 306). The presentation may comprise routing the customer communication to the appropriate service system 188, such as, following the example above, a service system which may allow balance payment. Presentation layer 180, similar to method 200, may present an accuracy inquiry to see if the customer would like to take the recommended action, and the customer may input an accuracy response. Based on the accuracy response, communication decision engine 186 may route the customer communication to the appropriate service system 188 (or allow the customer communication to remain at the current service system 188).

This process and system improves the functioning of the computer. For example, by predictive communication system 120 integrating with the Information Channels (i.e., systems of record 82, internal channels 84, and/or external channels 86) and receiving account activity data therefrom, predictive communication system 120 may analyze the account activity data to predict the intent or reason for a customer's call (or other customer communication into internal system 101 to take some account action). The structure of and process enabled by system 100 improves computer function because information between multiple channels and systems may be transmitted and/or retrieved in order to predict the intent of a customer communication. For example, a customer may perform an account action (i.e., account activity) through internal channels 84, and may transition between communication channels (e.g., from internal channels 84 to a telephone call to complete the action). Because of the account activity data retrievable from the integration between predictive communication system 120 and the Information Channels, internal system 101 may predict the reason for the customer's call (e.g., to complete the account action). That is, information may be readily shared between communication channels and components within system 100 and/or internal system 101. Therefore, internal system 101 may not require the customer to provide information about the account action upon the customer calling internal system 101, and the customer may be automatically transferred to the correct service system 188 (e.g., an automated system, or a customer service representative), providing greater efficiency for both internal system 101 and the customer. This results in more accurate data and speeds the processing of the service requests.

The disclosure and claims do not describe only a particular outcome of predicting customer communication intent, but the disclosure and claims include specific rules for predicting customer communication intent, and that render information into a specific format that is then used and applied to create the desired results of a customer intent prediction, as set forth in McRO, Inc. v. Bandai Namco Games America Inc. (Fed. Cir. case number 15-1080, Sep. 13, 2016). In other words, the outcome of predicting customer communication intent can be performed by many different types of rules and combinations of rules, and this disclosure includes various embodiments with specific rules. While the absence of complete preemption may not guarantee that a claim is eligible, the disclosure does not sufficiently preempt the field of predicting customer communication intent at all. The disclosure acts to narrow, confine, and otherwise tie down the disclosure so as not to cover the general abstract idea of just predicting customer communication intent. Significantly, other systems and methods exist for predicting customer communication intent, so it would be inappropriate to assert that the claimed invention preempts the field or monopolizes the basic tools of predicting customer communication intent. In other words, the disclosure will not prevent others from predicting customer communication intent, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer (e.g., web client 192) is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user (e.g., via a display screen on web client 192). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a customer profile, (ii) a transaction account, and/or (iii) account activity data. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The customer may be identified as a customer of interest to a merchant based on the customer's transaction data (including transaction history) at the merchant, account activity data, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® or Spark™ cluster configured to process and store big data sets with some of nodes comprising a distributed storage system and some of nodes comprising a distributed processing system. In that regard, distributed computing cluster may be configured to support a Hadoop® or Spark™ distributed file system (HDFS) as specified by the Apache Software Foundation at http://hadoop.apache.org/docs/or https://spark.apache.org/, respectively. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015;

and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel (e.g., internal channels 84 and/or external channels 86) may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "customer profile" or "customer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

Practitioners will appreciate that web client 192 may or may not be in direct contact with an application server. For example, web client 192 may access the services of an application server through another server and/or hardware component, which may have a direct or indirect connection to an Internet server. For example, web client 192 may communicate with an application server via a load balancer. In various embodiments, access is through a network or the Internet through a commercially-available web-browser software package.

As those skilled in the art will appreciate, web client 192 includes an operating system (e.g., WINDOWS®/CE/Mobile, OS2, UNIX®, LINUX®, SOLARIS®, MacOS, etc.) as well as various conventional support software and drivers typically associated with computers. Web client 192 may include any suitable personal computer, network computer, workstation, personal digital assistant, cellular phone, smart phone, minicomputer, mainframe or the like. Web client 192 can be in a home or business environment with access to a network. In various embodiments, access is through a network or the Internet through a commercially available web-browser software package. Web client 192 may implement security protocols such as Secure Sockets Layer (SSL) and Transport Layer Security (TLS). Web client 192 may implement several application layer protocols including http, https, ftp, and sftp.

In various embodiments, components, modules, and/or engines of system 100 and/or internal system 101 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of web client 192 may be further equipped with an Internet browser connected to the Internet or an intranet using standard dial-up, cable, DSL or any other Internet protocol known in the art. Transactions originating at web client 192 may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a My SQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, Google- Pay®), private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. .sctn. 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "customer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A customer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a customer. In addition, in various embodiments, a customer may be identified by a variety of identifiers, including, for example, an email address, a telephone number, a cookie id, a radio frequency identifier (RFID), a biometric, username, password, and/or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular customer through the customer's use of the issuer's transaction instrument and/or transaction account. Internal data may be gathered before, during, or after a relationship between the credit issuer and the transaction account holder (e.g., the customer or buyer). Such data may include consumer demographic data. Customer demographic data includes any data pertaining to a consumer. Customer demographic data may include consumer name, address, telephone number, email address, employer and social security number. Customer transactional data is any data pertaining to the particular transactions in which a customer engages during any given time period. Customer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Customer payment data includes any data pertaining to a consumer's history of paying debt obligations. Customer payment data may include consumer payment dates, payment amounts, balance amount, and credit limit. Internal data may further comprise records of consumer service calls, complaints, requests for credit line increases, questions, and/or comments (examples of account activity data). A record of a customer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Therefore, the following is claimed:

1. A computer-implemented method, comprising:
   training a predictive computer model of at least one computing device to determine a ranking of intent insights based on prior servicing interactions with users;
   receiving, by the at least one computing device, a communication from a user;
   identifying, by the at least one computing device, a profile associated with the user;
   accessing, by the at least one computing device, real-time activity data associated with the profile and obtained from a real-time stream processor of one or more internal channels via a messaging bus;
   filtering, by the at least one computing device, the real-time activity data by comparing the real-time activity data to a specified threshold limit;
   determining, by the at least one computing device, that a redeemable value accumulation of reward points in the real-time activity data has reached the specified threshold limit;
   generating, by the at least one computing device using the predictive computer model, a ranking of a plurality of intent insights associated with the communication according to one or more of a plurality of intent prediction rules based at least in part on the redeemable value accumulation of reward points reaching the specified threshold limit, wherein the ranking of the plurality of intent insights is further based at least in part on one or more social media posts on a social network related to a transaction account of the user;
   selecting, by the at least one computing device, a ranked intent insight as an intent prediction alert, wherein the intent prediction alert comprises a predicted reason for the communication;
   routing the communication to a service system based at least in part on the intent prediction alert;
   transmitting a context message to an operator of the service system receiving the communication in response to routing the communication to the service system, wherein the context message includes at least the intent prediction alert;
   transmitting, by the at least one computing device to a client device of the user, the ranking of the plurality of intent insights and a user feedback inquiry comprising an accuracy inquiry to confirm whether individual ones of the plurality of intent insights are accurate; and
   retraining the predictive computer model of the at least one computing device based on the user feedback.

2. The computer-implemented method of claim 1, further comprising receiving an accuracy response from the user via a wireless communication channel, the accuracy response being entered via an electronic input.

3. The computer-implemented method of claim 1, wherein the ranking of the plurality of intent insights and the user feedback inquiry are transmitted to the client device as a push notification.

4. The computer-implemented method of claim 1, further comprising:
determining a priority insight of the plurality of intent insights; and
adjusting the ranking of the plurality of intent insights based at least in part on the priority insight such that the priority insight is a highest ranking intent insight of the plurality of intent insights.

5. The computer-implemented method of claim 1, wherein generating the ranking of the plurality of intent insights is based at least in part on a chronological order.

6. The computer-implemented method of claim 1, further comprising:
determining, by the at least one computing device, that a value of accumulation of late fees in the real-time activity data has reached a particular threshold limit, wherein the ranking of the plurality of intent insights are generated based at least in part on the value of the accumulation of late fees.

7. The computer-implemented method of claim 1, wherein the ranking of the plurality of intent insights is further based at least in part on a fraud alert communicated to the user regarding the transaction account of the user.

8. A computer system, comprising:
a processor;
a memory; and
instructions stored in the memory and executable by the processor, the instructions causing the computer system to at least:
train a predictive computer model to determine a ranking of intent insights based on prior servicing interactions with users;
receive a communication from a user;
identify a profile associated with the user;
access real-time activity data associated with the profile and obtained from a real-time stream processor of one or more internal channels via a messaging bus;
filtering the real-time activity data by comparing the real-time activity data to a specified threshold limit;
determine that a redeemable value accumulation of reward points in the real-time activity data has reached the specified threshold limit;
generate, using the predictive computer model, a ranking of a plurality of intent insights associated with the communication according to one or more of a plurality of intent prediction rules based at least in part on the redeemable value accumulation of reward points reaching the specified threshold limit, wherein the ranking of the plurality of intent insights is further based at least in part on one or more social media posts on a social network related to a transaction account of the user;
select a ranked intent insight as an intent prediction alert, wherein the intent prediction alert comprises a predicted reason for the communication;
route the communication to a service system based at least in part on the intent prediction alert;
transmit a context message to an operator of the service system receiving the communication in response to routing the communication to the service system, wherein the context message includes at least the intent prediction alert;
transmit, to a client device of the user, the ranking of the plurality of intent insights and a user feedback inquiry comprising an accuracy inquiry to confirm whether individual ones of the plurality of intent insights are accurate; and
retrain the predictive computer model of the at least one computing device based on the user feedback.

9. The computer system of claim 8, wherein the instructions further causes the computer system to at least receive an accuracy response from the user via a wireless communication channel, the accuracy response being entered via an electronic input.

10. The computer system of claim 8, wherein the ranking of the plurality of intent insights and the user feedback inquiry are transmitted to the client device as a push notification.

11. The computer system of claim 8, wherein the instructions further cause the computer system to perform:
determining a priority insight of the plurality of intent insights; and
adjusting the ranking of the plurality of intent insights based at least in part on the priority insight such that the priority insight is a highest ranking intent insight of the plurality of intent insights.

12. The computer system of claim 8, wherein generating the ranking of the plurality of intent insights is based at least in part on a chronological order.

13. The computer system of claim 8, wherein the instructions further cause the computing system to determine that a value of accumulation of late fees in the real-time activity data has reached a particular threshold limit, wherein the ranking of the plurality of intent insights are generated based at least in part on the value of the accumulation of late fees.

14. The computer system of claim 8, wherein the ranking of the plurality of intent insights is further based at least in part on a fraud alert communicated to the user regarding the transaction account of the user.

15. A non-transitory computer-readable medium storing instructions executable in a processor of a computer system, the instructions causing the computer system to at least:
train a predictive computer model to determine a ranking of intent insights based on prior servicing interactions with users;
receive a communication from a user;
identify a profile associated with the user;
access real-time activity data associated with the profile and obtained from a real-time stream processor of one or more internal channels via a messaging bus;
filter the real-time activity data by comparing the real-time activity data to a specified threshold limit;
determine that a redeemable value accumulation of reward points in the real-time activity data has reached the specified threshold limit;
generate, using the predictive computer model, a ranking of a plurality of intent insights associated with the communication according to one or more of a plurality of intent prediction rules based at least in part on the redeemable value accumulation of reward points reaching the specified threshold limit, wherein the ranking of the plurality of intent insights is further based at least in part on one or more social media posts on a social network related to a transaction account of the user;
select a ranked intent insight as an intent prediction alert, wherein the intent prediction alert comprises a predicted reason for the communication;
route the communication to a service system based at least in part on the intent prediction alert;

transmit a context message to an operator of the service system receiving the communication in response to routing the communication to the service system, wherein the context message includes at least the intent prediction alert;

transmit, to a client device of the user, the ranking of the plurality of intent insights and a user feedback inquiry comprising an accuracy inquiry to confirm whether individual ones of the plurality of intent insights are accurate; and retrain the predictive computer model of the at least one computing device based on the user feedback.

16. The non-transitory computer-readable medium of claim 15, wherein the instructions further cause the computer system to at least receive an accuracy response from the user via a wireless communication channel, the accuracy response being entered via an electronic input.

17. The non-transitory computer-readable medium of claim 15, wherein the ranking of the plurality of intent insights and the user feedback inquiry are transmitted to the client device as a push notification.

18. The non-transitory computer-readable medium of claim 15, wherein the instructions further cause the computing system to determine that a value of accumulation of late fees in the real-time activity data has reached a particular threshold limit, wherein the ranking of the plurality of intent insights are generated based at least in part on the value of the accumulation of late fees.

19. The non-transitory computer-readable medium of claim 15, wherein the ranking of the plurality of intent insights is generated based at least in part on a chronological order.

20. The non-transitory computer-readable medium of claim 15, wherein the ranking of the plurality of intent insights is further based at least in part on a fraud alert communicated to the user regarding the transaction account of the user.

* * * * *